June 21, 1932. R. CLOPPERT 1,863,897
METHOD OF RENEWING WINDSHIELD GLASSES AND AN
IMPLEMENT USED IN THE PRACTICE OF THE METHOD
Filed April 7, 1930 2 Sheets-Sheet 1
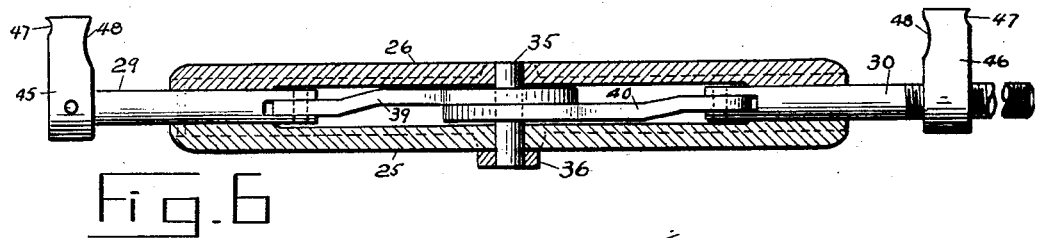
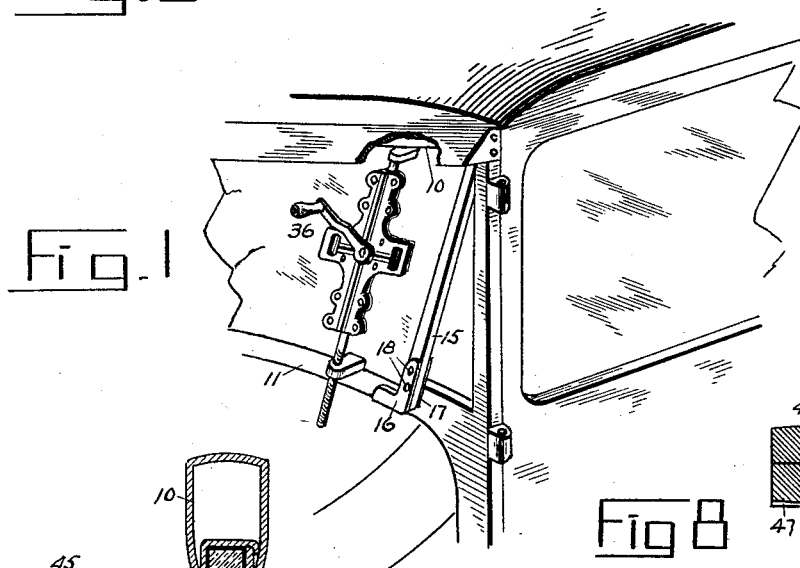
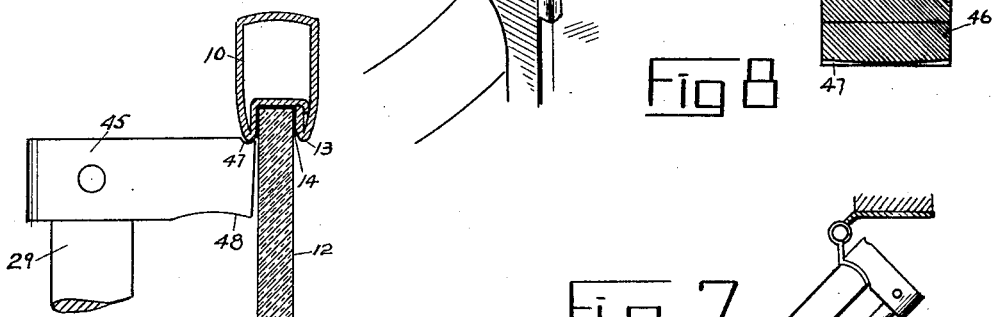
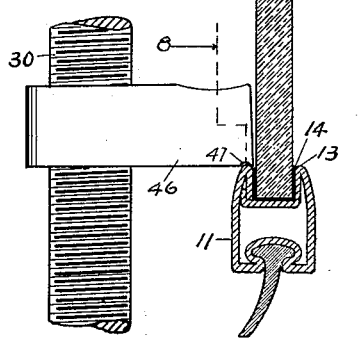
INVENTOR
Ralph Cloppert,
BY Fassett and Fassett.
ATTORNEYS.

June 21, 1932.  R. CLOPPERT  1,863,897
METHOD OF RENEWING WINDSHIELD GLASSES AND AN
IMPLEMENT USED IN THE PRACTICE OF THE METHOD
Filed April 7, 1930  2 Sheets-Sheet 2
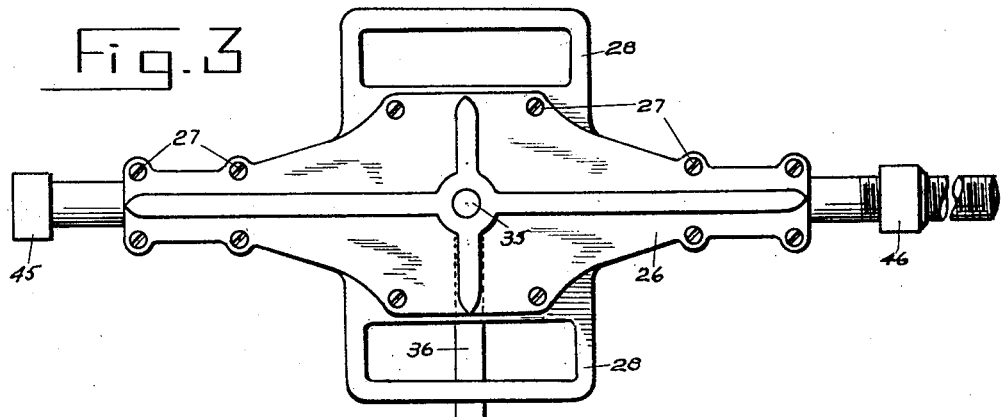
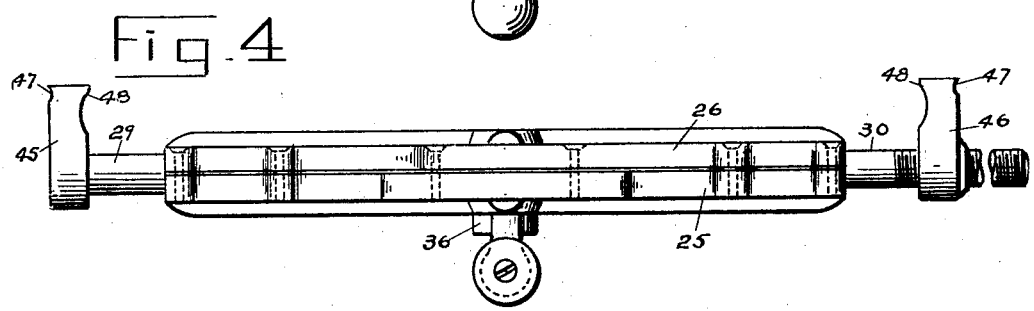
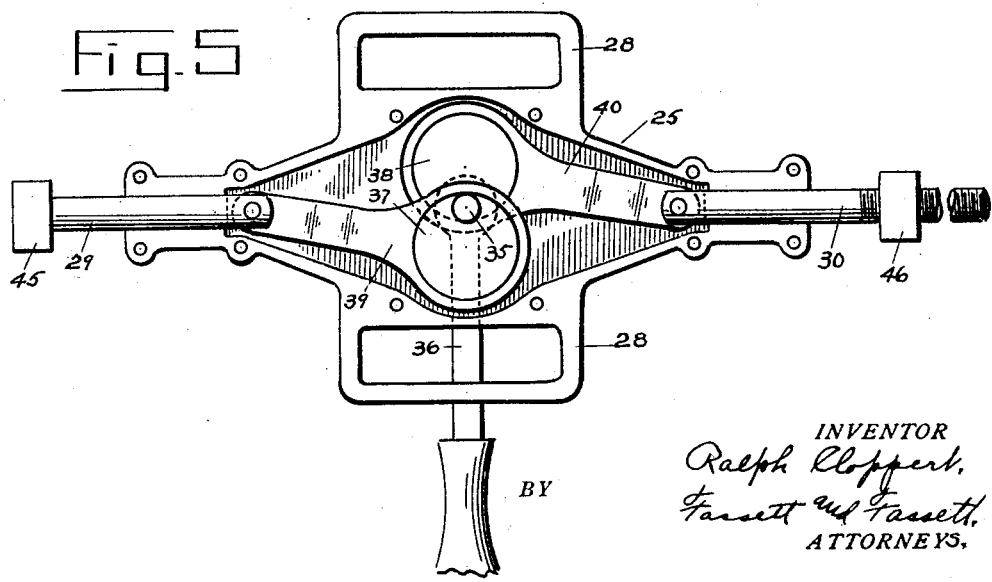
INVENTOR
Ralph Cloppert,
Fassett and Fassett,
ATTORNEYS.

Patented June 21, 1932

1,863,897

UNITED STATES PATENT OFFICE

RALPH CLOPPERT, OF DAYTON, OHIO

METHOD OF RENEWING WINDSHIELD GLASSES AND AN IMPLEMENT USED IN THE PRACTICE OF THE METHOD

Application filed April 7, 1930. Serial No. 442,245.

This invention relates to renewing glasses in wind shields of automobiles. The most difficult part of the operation of renewing a wind-shield glass is opening the metal frame. Usually the vertical end members of the frame are connected to the upper or lower members by slip joints, screws or bolts being used to prevent the joints slipping apart. These slip joints are usually very tight, in order to prevent rattling, making it difficult to pull them apart. This difficulty is often enhanced by rust or other causes, with the result that it has generally been necessary to use heavy blows of a hammer to separate the parts.

The difficulties of renewing wind-shield glasses have been much increased since the advent of so-called non-shatterable wind shield glass. Plain glass shatters and falls out of the frame, thereby leaving the frame accessible to the workman's hammer or other tool by which he drives the members of the frame apart. The non-shatterable glass cracks, but remains intact, and the workman has to chip out enough of the glass with a cold chisel to enable him to get a tool in to drive the frame apart. As the glass is wedged tightly into the several frame members by strips of fabric interposed between the glass and the frame, it is very difficult to separate the frame members if the broken glass is of the non-shatterable kind, especially when the glass tends to stick in the frame, as is frequently the case. It is often necessary to use blows of such violence in opening the frame that the frame members become disfigured, and they are sometimes so distorted by the hammer blows that destructive strains are imposed on the new glass, causing the glass to break, even hours after the glass is put into the frame.

It is also difficult to reassemble the frame with the new glass in it. New fabric is usually necessary to interpose between the glass and frame, and considerable force is required to press the glass and fabric into the frame grooves; furthermore, until the fabric becomes "set" in its confined quarters it tends to expel the glass. It is therefore necessary to press the parts of the frame firmly together, and hold them so while the screws or bolts are put in place.

To overcome these difficulties and enable a workman to easily and quickly separate the parts of the frame, and then press the parts of the frame together with the new glass in place, I have devised a tool or implement which is adapted to separate the frame members by outward pressure applied at the lips of the grooves of opposite frame members. After the new glass is in place the same implement is used to press the frame members together and hold all parts in place while the screws are put in the frame. My implement is so arranged that all of this can be done without detaching the frame of the wind shield from the car.

I shall now describe my invention in detail, with the assistance of the accompanying drawings, in which:

Fig. 1 illustrates a portion of the top and windshield of an automobile, showing my implement in place on the wind shield, ready to separate the lower member of the frame from the remainder of the frame;

Fig. 2 is fragmental view, showing parts of the wind shield frame, together with the parts of my implement which co-act therewith;

Fig. 3 is an elevational view of the implement showing the side which faces the wind shield when in use;

Fig. 4 is a side view of the implement;

Fig. 5 is a view similar to Fig. 3, but with half of the casing removed to exhibit the interior mechanism;

Fig. 6 is a view similar to Fig. 4, but with half of the casing broken away to exhibit the interior mechanism;

Fig. 7 is an end view of the wind shield, swung outward sufficiently to allow the implement to be used to close the frame after the glass has been put in place; and Fig. 8 is a fragmental sectional view on line 8 of Fig. 2.

To fully appreciate the problem my invention is designed to solve, it is necessary to understand the construction of a typical wind shield. Referring to Fig. 2, the top and bottom frame members, 10 and 11, of one type of wind shield are shown in section, practically full size. These members are made of sheet steel, bent to a tubular form, and providing grooves to receive the glass 12. At each side of the groove there is a lip 13, these lips being made narrow in order to give the frame a graceful appearance. A packing of felt or fabric is interposed between the walls of the grooves and the glass, to prevent the glass rattling and permit of the glass being practically water tight in the grooves, without danger of cracking the glass. This packing is indicated at 14 in Fig. 2 by a thick line.

Referring now to Fig. 1, it will be seen that the frame member 11 is connected to the end member 15 by means of clamping plates 16 and 17, which plates are permanently secured to the member 11. The ends of the members 11 and 15 are mitered, and when the member 15 is in place between the plates 16 and 17, screws or bolts are put in at 18 and tightened. The other lower corner of the frame is similarly secured, and thus very snug joints are formed. At the upper corner, the members 10 and 15 are permanently joined, and the member 10 is similarly joined to the vertical member at the other end of the frame. In addition to the plates 16 and 17 hugging the member 15 tightly, rust and/or other causes make it difficult to separate the member 11 from the vertical end members. This is especially so where the glass has remained intact, for the packing 14 tends to hold the frame members to the glass.

I shall now describe the implement whereby I open the frame to take out the old glass, referring to Figs. 3, 4, 5 and 6. The body of the implement consists of a casing composed of two members, indicated by numerals 25 and 26, joined with screws 27. At each side the member 25 has a handle 28. At the ends of the casing bearings are formed to receive rods, 29 and 30, respectively, the rods being free to slide in and out in these bearings. Journaled in the casing members is a transversely disposed shaft 35, one end of which shaft extends a sufficient distance outside of the casing to receive an operating handle 36. Secured to the shaft are two eccentrics, 37 and 38. These eccentrics extend in opposite directions from the shaft, and they occupy different planes. A pitman 39 connects eccentric 37 to the rod 29, and a similar pitman, 40, connects eccentric 38 to rod 30. It is therefore to be seen that rotating the shaft 35 by means of the handle 36 causes movement in and out of the rods 29 and 30. As shown in the drawings the eccentrics are integral with the shaft 35, but I do not limit myself to this particular construction. Furthermore, cranks might be substituted for the eccentrics. The advantage of the eccentrics is the increased wearing surface they afford and the saving in space, laterally, which they effect. The casing is filled with cup grease, making other lubrication unnecessary.

Secured to the outer end of the rod 29 is a block 45, which extends laterally from the shaft. A similar block, 46, is carried by the rod 30, but instead of being fixed on the end of the rod, the rod and block are threaded, so that the block may be moved to and fro on the rod to adjust the implement to wind shields of various sizes. Each of the blocks, 45 and 46, is provided with a groove 47 adapted to fit over the lip 13 of the wind shield member, as is shown in Fig. 2. The object of this groove is to prevent the block from slipping off of the lip, and in view of its purpose I call the grooved part of the block its toe. Fig. 1 shows the toes of the blocks hooked on the lips of the frame members 10 and 11, and it is plain that by turning the handle 36 the member 11 can be forced away from the unit composed of members 10 and 15.

Before putting the implement in place the handle 36 is moved to a position which draws the rods 29 and 30 fully inward, and the block 46 is screwed in or out to a position such that the toes can just be hooked over the lips of opposite frame members. As the eccentrics are on "dead center" when the rods are retracted to their limit, it follows that will require considerable movement of the handle 36 in the beginning to effect an appreciable movement of the rods, thus giving the handle great leverage. In other words, manual power applied to the handle is very much amplified, thereby enabling the user of the implement to bring great pressure into play to start separating the parts, which is usually the most difficult part of the operation of opening the frame. The more the frame members are separated the easier it becomes to move them, so it is immaterial that the leverage of the handle is gradually reduced as the handle approaches its halfway position. Providing toes to hook over the lips of the frame prevents the blocks slipping off of the lips notwithstanding the narrowness of the lips. As the lower member of a windshield is often curved, causing the upper and lower members to be considerably unparallel at points near the ends of the shield, I prefer to give the toes 47 and heels 48 a slight curvature, thereby insuring firm seating of the blocks. This curvature is plainly shown in Fig. 8, but it is not indicated in the other views because the curvature is so slight that it could not be effectively illustrated. Fig. 8 is typical of blocks 45 and 46. As is seen in Fig. 1, it is not necessary to detach the wind shield from the car top.

Having opened the frame and disposed of the broken glass, the new glass is put in the frame and the implement is then used to close the frame. To do this the frame is swung outward, as in Fig. 7, to allow the block 45 to rest on the outside of the frame member 10. The portions of the blocks 45 and 46 which bear on the frame members in closing the frame I call heels, for want of a better name. These heels, indicated at 48, are adapted to engage the outer edges of the frame members without danger of slipping off.

The wind shield shown in the drawings is one of several well known types. In fact, the one here shown is perhaps the easiest to open, and the reason it was used as an example is because of the comparative ease with which it can be illustrated and described. In many wind shields the frames come apart at the upper corners. Various slip joint constructions are used, and in some much force is needed to separate them. It is immaterial how the slip joint is constructed, however, or whether the members separate at the top or bottom of the frame; my implement is adapted to perform the described operation, regardless of how the frames are made.

Not only is injury to and disfigurement of the frame avoided by the use of my implement, but the time consumed in renewing a glass is very much reduced. Using my implement a man can renew a glass in one-third of the time it would require him to renew it by the old method, while danger of breaking the new glass is practically eliminated. Heretofore workmen have had to hammer the frame members together and in doing so have often broken the new glass. Another common difficulty has been the tendency of the frame to spring apart slightly after its members have been hammered home, making it difficult to put in the screws or bolts by which the frame members are fastened. All of these difficulties are overcome by the use of my implement.

While I have illustrated what I at present consider the preferred embodiment of my invention, it is not to be understood that I limit myself to the particular details shown, as various modifications are possible without departing from the spirit of my invention. One such modification would consist in dispensing with the eccentric 38 and pitman 40, in which case the block 46 might be rigidly secured to the rod 30, as the block 45 is secured to the rod 29, and the inner end of the rod 30 threaded to screw into instead of slide in the bearing in the casing, the bearing being threaded to receive the rod. As this modification would be within the skill of a mechanic it is not necessary to illustrate the suggested change.

Having fully described my method of renewing wind shield glasses, and an implement adapted to employment in the practice of my method, I claim as my invention the following.

1. The method of opening a wind shield frame to put in a glass, which comprises applying pressure simultaneously in opposite directions to the lips of the grooves of opposite frame members.

2. The method of opening a wind shield frame to put in a glass, which comprises applying amplified manual pressure simultaneously in opposite direction to the lips of the grooves of opposite frame members.

3. The method of opening a wind shield frame to put in a glass, which comprises applying pressure simultaneously in opposite directions to the lips of the grooves of opposite frame members, applying said pressure through the medium of blocks, the toes whereof hook over said lips, thereby insuring non-slippage of the blocks from the lips.

4. The method of opening a wind shield frame to put in a glass, which method comprises applying manual pressure simultaneously in opposite directions to the lips of the grooves of opposite frame members, amplifying said pressure very much at the beginning, whereby to start relative movement between the frame members at the points where they are required to separate.

5. The method of opening a wind shield frame, which method comprises applying manual pressure simultaneously in opposite directions to the lips of the grooves of opposite frame members, amplifying said pressure very much at the beginning, whereby to facilitate starting relative movement between the frame members at the points where they are required to separate, gradually diminishing the amplification as separative movement progresses.

6. The method of opening and closing a wind shield frame to put in a glass, which comprises applying pressure simultaneously in opposite directions to the lips of the grooves of opposite frame members, applying said pressure through the medium of blocks, the toes whereof hook over said lips, then, after the glass is in place, closing the frame by pressure applied through the medium of said blocks, the heels thereof being brought to bear on the outer edges of said opposite frame members.

7. The method of opening and closing a wind shield frame, which comprises applying pressure simultaneously in opposite directions to the lips of the grooves of opposite frame members, applying said pressure through the medium of blocks, the toes whereof hook over said lips, then, after the glass is in place, closing the frame by pressure applied through the medium of said blocks, the heels thereof being brought to bear on the outside edges of said frame members, said pressure being maintained while the screws are put in the frame.

RALPH CLOPPERT.